United States Patent [19]
Goeb et al.

[11] Patent Number: 5,688,573
[45] Date of Patent: Nov. 18, 1997

[54] HALOGEN-FREE ACRYLIC URETHANE SHEET MATERIAL

[75] Inventors: Siegfried Goeb; Iris Maassen, both of Willich, Germany

[73] Assignee: Minnesota Mining and Manufacturing Company

[21] Appl. No.: 545,543

[22] Filed: Oct. 19, 1995

Related U.S. Application Data

[63] Continuation of Ser. No. 244,355, filed as PCT/US92/09573, Nov. 6, 1992, abandoned.

[30] Foreign Application Priority Data

Dec. 18, 1991 [DE] Germany .................. 41 41 914.6

[51] Int. Cl.$^6$ .................................................. C08G 18/00
[52] U.S. Cl. .................. 428/40.1; 283/81; 428/343; 428/355; 428/423.1; 524/730; 525/124; 525/125
[58] Field of Search ............... 428/40.1, 355, 428/343, 423.1; 524/730; 525/124, 125; 283/81

[56] References Cited

U.S. PATENT DOCUMENTS

| | | | |
|---|---|---|---|
| 3,700,643 | 10/1972 | Smith et al. | 260/77.5 AN |
| 4,271,223 | 6/1981 | Lambert et al. | 428/207 |
| 4,772,512 | 9/1988 | Nagafuchi | 428/331 |
| 4,808,471 | 2/1989 | Grunzinger | 428/325 |
| 4,892,906 | 1/1990 | Pham et al. | 524/730 |

FOREIGN PATENT DOCUMENTS

| | | |
|---|---|---|
| 81 30 861 U | 1/1983 | Germany . |
| 61-12759 | 2/1989 | Japan . |
| A-2-120 042 | 5/1990 | Japan . |

OTHER PUBLICATIONS

Chem Abst. 113(18), 153979c, Heat-resistant sheets for laser-markable labels.

*Primary Examiner*—Nasser Ahmad
*Attorney, Agent, or Firm*—Gary L. Griswold; Walter N. Kirn; Steven E. Skolnick

[57] ABSTRACT

A halogen-free acrylic urethane sheet material 10 is disclosed which can be marked by conventional printing methods and by radiation methods. The halogen-free acrylic urethane sheet material of the invention is manufactured from a polymer comprising components A, B and C wherein component A comprises a copolymer of
(i) a monoester of acrylic or methacrylic acid and an aliphatic diol having 2 to 8 carbon atoms and
(ii) an ester of acrylic or methacrylic acid and an aliphatic alcohol having 1 to 8 carbon atoms, and optionally a vinyl aromatic monomer as well as N-vinylpyrrolidone or N-vinylcaprolactame, said component A having a $T_g$ of 30° C. to 100° C., component B comprising an aliphatic polyester diol with a molecular weight less than 20,000 and component C comprising a polyfunctional isocyanate or blocked polyfunctional isocyanate.

26 Claims, 2 Drawing Sheets

HALOGEN-FREE ACRYLIC URETHANE SHEET MATERIAL

This is a continuation of application Ser. No. 08/244,355, filed May 26, 1994 now abandoned which is a national stage of PCT/US92/09573 filed Nov. 6, 1992.

FIELD OF THE INVENTION

The invention is related to a halogen-free acrylic urethane sheet material which is markable with conventional as well as radiation methods. Furthermore, the invention is related to a process for preparing this halogen-free acrylic urethane sheet material as well as single or multilayer halogen-free acrylic urethane sheet materials and label stocks.

BACKGROUND

Polymeric films such as plasticized polyvinyl chloride have been used for many years as backings for adhesive labels, tapes and decorative sheets. Polymeric films have had wide acceptance for such applications because, among other things, they are inexpensive and weather resistant and can be colored easily with pigments and dyes. In addition, plasticized polyvinyl chloride has had particularly wide acceptance because its properties can be modified over a wide range by incorporation of plasticizers.

Recently, however, halogen-containing materials in general have been recognized as producing undesirable by-products when burned. The gases given off are corrosive, present a health risk and have been implicated in destruction of the atmospheric ozone layer.

Specifically, plasticized polyvinyl chloride has an additional drawback when used as a backing for adhesive coated sheet material or tapes. Problems are often encountered with migration of the plasticizer into the adhesive coating. The adhesive properties are altered or destroyed as the plasticizer migrates from the polyvinyl chloride into the adhesive coating. Plasticizers are also known to evaporate with time or at elevated temperatures, thereby producing an unacceptably brittle film.

Thus, there exists a need for a polymeric backing which has the physical properties and advantages of plasticized polyvinyl chloride, but does not contain halogen atoms or other moieties which produce noxious by-products upon incineration and which are even more resistant to the effects of aging, chemicals, high temperatures and natural weathering.

U.S. Pat. No. 4,271,223, Lambert, discloses a plastic film label stock to which ordinary printing inks adhere strongly without any surface treatment of the plastic backing so that the printing on the labels is highly resistant to abrasion. The plastic film which is used for the label stock comprises a polymer of an addition-polymerizable urethane oligomer. The urethane oligomer is based on oligomeric alcohols which can include polyester polyols, polyether polyols, polyacrylate polyols, polyolefin polyols and polysiloxane polyols. The oligomeric alcohols must have a glass transition temperature (Tg) of below 23° C. The polymerizable urethane oligomer is preferably mixed with a multifunctional acrylate cross-linking agent and cured by photopolymerization induced by UV-radiation.

Grunzinger discloses in U.S. Pat. No. 4,808,471 a top coat of a retroreflective sheeting which is made of a mixture of hydroxy-functional acrylic polyols and a curing agent which is an aliphatic polyfunctional isocyanate such as the biuret of 1,6-hexamethylene diisocyanate. The retroreflective sheeting may have a dual-layer top coat, the outer layer being relatively hard to provide good resistance to solvents, abrasion and weathering, and the inner layer being softer to make the sheeting more conformable. Preferred starting materials for the hydroxy-functional acrylic polyol are esters of methacrylic acid, an acrylic acid ester having at least 4 carbon atoms in its ester group and a hydroxy-functional acrylate or methacrylate. These should be selected in such a manner that the polyol has a glass transition temperature Tg of from −20° C. to 30° C. The outer layer consists of a polymer with a Tg of 0° C. to 30° C. whereas the inner layer shows a Tg of −20° C. to 0° C.

Various self-adhesive markable materials in the form of self-adhesive sheets or films have been known, which may be marked, for example, by means of a laser beam. Such markable materials are predominately used in the commercial sector. Laser-markable adhesive labels containing PVC are mostly used, for example in 3M Scotchcal 100 Laser Script. The top layer is partially removed by means of the laser beam and then the bottom layer of a different color is exposed to form an image. Upon this type of marking corrosive gases may be formed, inter alia due to the vaporization of the top layer.

The German utility model G 81 30 861 discloses a multilayer label consisting of two layers of lacquer. These layers of lacquer consist of e.g. polyurethane crosslinked by radiation. A preferred lacquer consists of a mixture of hexanediol bisacrylate and a commercially available polyurethane acrylate which is composed of a long-chain polyester diol, an aliphatic diisocyanate and terminal acrylic moieties. The mixture is cured by an electron beam.

Laser markable labels of this kind are obtainable under the trade name TESA 6930 (Company Beiersdorf). The backing of these labels requires radiation curing which is a costly and critical process. By this process the possibility of adjusting mechanical properties is limited. Consequently the labels show little flexibility and do not conform to irregular surfaces.

Also commercially available are laser-markable adhesive labels of the company W. H. Brady Company, Milwaukee, U.S.A. These labels are predominately made of biaxially orientated polyesters. These labels shrink when exposed to high temperature and are not tamper-proof. These adhesive labels consist of a top layer and a bottom layer, both of which have been dyed in different colors.

In Chemical Abstracts 113 (18), 153979c (JP-A-90 120042) there have been described heat-resistant self-adhesive (pressure-sensitive) films which are used as laser-markable labels. To this end 3,3'4,4'-biphenyltetracarboxylic acid anhydride 3,3'-thiodianiline polyamino acid is mixed with carbon black, dried and treated at 180° C. for 60 minutes and then at 250° C. for six hours. one surface of the resulting layer was coated with a titanium dioxide containing a solution of said compound and the layer was also treated at an elevated temperature. The reverse surface of the layer was provided with a silicone-based pressure-sensitive adhesive. Upon the evaporation of this polymer in a laser beam there may also occur corrosive conversion products such as $SO_2$.

Nagafushi, in U.S. Pat. No. 4,772,512, discloses a composite film for bar code labels comprising first and second heat resisting non-water-absorbing synthetic resin films. On the first film of the composite film, bar codes can be reproduced by means of a high speed dry process electrostatic copier. As the first and second heat resisting, non-water-absorbing synthetic resin films in the composite film polyester films, polyimido films, polycarbonate films, cellulose ester films and polyamide films are used. This reference is silent with respect to a halogen-free acrylic urethane sheet material being radiation markable.

The most commonly used PVC-containing plastic film sheet materials of the prior art are disadvantageous because they contain plasticizers. If this materials are used for self-adhesive labels, plasticizers move into the adhesive layer and destroy the adhesive properties of the adhesive layer. This may result in a destruction of the adhesive layer and the label falls off. On the other hand, the loss of plasticizers in the PVC layer leads to altered mechanical properties of the PVC layer. Thus, this layer may become brittle and disintegrated. The PVC containing labels can also be marked either by radiation marking methods or by conventional printing methods, e.g. by ink. Furthermore, these plastic film sheet materials often do not have the necessary mechanical properties such as handlability or die-cuttability or do not show sufficient heat-resistance, weathering stability or solvent resistance.

The halogen-free labels of the prior art show the above mentioned drawbacks, e.g. little flexibility restricting their use. A further drawback of the radiation curable label is the costly establishing of special equipment for the electron beam or UV curing.

SUMMARY OF THE INVENTION

It is an object of the present invention to provide halogen-free sheet materials for various purposes e.g. markable halogen-free sheet materials, multilayer markable sheet materials or label stocks which are markable by conventional printing methods as well as radiation marking methods. Another object of the invention is to provide halogen-free sheet materials as mentioned before, which show excellent mechanical properties and resistance to severe environmental stress like heat, solvents or weathering. These halogen-free sheet materials must still have the same application spectrum as the PVC containing plastic film sheet like color matching, cutting properties, adjustability of softness but also should avoid their drawbacks. Especially the sheet materials must have environmental compatibility and migration of plasticizer into the pressure sensitive adhesive must not occur. Yet another object of the invention is to provide a sheet material for manufacturing die-cuttable label stocks as well as decorative sheet materials.

Still another object of the invention is to provide a process for manufacturing sheet materials which does not require high temperature or high energy radiation curing. In particular the sheet materials should be manufacturable in a continuous process.

DETAILED DESCRIPTION

The sheet material of the invention is a halogen-free acrylic urethane sheet comprising a polymer comprising components A, B and C wherein
component A comprises a copolymer of
(i) a monoester of acrylic or methacrylic acid and an aliphatic diol having 2 to 8 carbon atoms and
(ii) an ester of acrylic or methacrylic acid and an aliphatic alcohol having 1 to 8 carbon atoms, and optionally a vinyl aromatic monomer as well as N-vinylpyrrolidone or N-vinylcaprolactame, said component A having a Tg of 30° C. to 100° C.,
component B comprising an aliphatic polyester diol with a weight-average molecular weight less than 20,000 and
component C comprising a polyfunctional isocyanide or blocked polyfunctional isocyanide.

Preferably, the sub-component (i) consists of a monoester of acrylic or methacrylic acid and an aliphatic diol having 2 to 4 carbon atoms. Sub-component (ii) consists preferably of an ester of acrylic or methacrylic acid and an aliphatic alcohol having 1 to 4 carbon atoms.

Examples of suitable monoesters of acrylic or methacrylic acids and aliphatic diols forming sub-component (i) of component A of the polymer of the invention are 2-hydroxyethyl acrylate, 2-hydroxy-1-methylethyl acrylate, 2-hydroxypropyl acrylate, 3-hydroxypropyl acrylate, 2-hydroxybutyl acrylate, 4-hydroxybutyl acrylate, 2-hydroxyethyl methacrylate, 2-hydroxy-1-methylethyl methacrylate, 2-hydroxypropyl methacrylate, 3-hydroxypropyl acrylate, 2-hydroxybutyl methacrylate and the like.

Typically, the monoestere of acrylic or methacrylic acid and aliphatic diols forming sub-component (i) of component A are present in amounts of 5 to 50% by weight and subcomponent (ii) 50 to 95% by weight of the total amounts of monomers (i) and (ii) used for the copolymer of component A.

Examples of suitable esters of acrylic or methacrylic acids and the aliphatic alcohol having 1 to 8 carbon atoms are methyl acrylate, ethyl acrylate, propyl acrylate, isopropyl acrylate, butyl acrylate, isobutyl acrylate, hexyl acrylate, 2-ethylhexyl acrylate, cyclohexyl acrylate, methyl methacrylate, ethyl methacrylate, propyl methacrylate, isopropyl methacrylate, butyl methacrylate, isobutyl methacrylate, hexyl methacrylate, 2-ethylhexyl methacrylate, cyclohexyl methacrylate and the like.

According to the invention it is also possible to add halogen-free vinylaromatic monomers to the alkylacrylates or methacrylates of the foregoing paragraph. Preferred is styrene or low alkyl substituted styrene such as α-methylstyrene. The aromatic system of the styrene can be substituted by low alkyl substituents which can be in o, p, m, position to the vinylic moiety. Besides the vinylaromatic monomers as mentioned N-vinylpyrrolidone and N-vinylcaprolactame may be used for substituting the monomers of subcomponent (ii). The vinylaromatic monomers can replace the monomer of sub-component (ii) up to 70% by weight based on the amount of sub-component (ii) present at maximum.

According to the invention it is necessary to provide a glass transition temperature (Tg) for component A of 30° C. to 100° C. If the Tg of component A is lower than 30° C. the entire composition consisting of component A, B and C becomes too soft to be used for manufacturing the sheet material of the invention. If the Tg is higher than 100° C. the composition of A, B and C becomes too brittle. Component A comprising the sub-components (i) and (ii) is present in amounts of from 15 to 80% by weight of total amount of the polymer comprising components A, B and C, preferably in amounts of from 30 to 60% by weight.

The weight-average molecular weight of component A consisting essentially of the subcomponents (i) and (ii) is preferably in the range of 1,000 to 500,000 measured by gel permeation chromatographic (GPC).

Component B of the composition of the invention comprises an aliphatic polyester diol branched or non-branched with a weight-average molecular weight less than 20,000. The polyester diol of the component B of the composition of the invention can generally be formed by the esterification of a polyol with a polycarboxylic acid or an acid anhydride. The aliphatic polyester diol conventionally employed in making the polyester diols include alkylene glycols, such as ethylene glycol, propylene glycol, burylens glycol and neopentyl glycol and other glycols such as cyclohexane dimethanol, caprolactonediol reaction products and similar type compounds.

Suitable carboxylic acids used in the reaction with the above-described polyols include adipic acid, sebacic acid, glutaric acid, chlorendic acid and the like. The weight-average molecular weight of the aliphatic polyesterdiol is preferably less than 10,000. The preferred polyesterdiol component B of the present invention is poly-epsilon-caprolactonediol having a weight-average molecular weight of 500 to 10,000. Component B is present in the polymer comprising the components A, B and C of the invention in amounts of from 5 to 50% by weight, preferably 15 to 30% by weight based on total amount of the polymer comprising the components A, B and C.

Component C comprises a polyfunctional isocyanide. Preferred isocyanates are aliphatic diisocyanates with an alkyl bridge between the isocyanide groups of 4 to 8 carbon atoms. These alkyl moieties may be branched or unbranched. Particularly preferred is 1,6-hexamethylenediisocyanate.

Also blocked polyfunctional isocyanates are suitable. The isocyanide moiety is transformed with suitable blocking agents into another moiety which can be regarded as a latent isocyanide group. Suitable blocking agents are those materials that unblock, for example, at elevated temperatures, thus generating again the isocyanide group. Suitable blocking agents are for example low aliphatic alcohols and oximes such as methylethylacetoneoxim or lactames such as caprolactame. Suitable blocked polyfunctional isocyanates include monomeric polyisocyanates, such as 4,4'-methylene bis-cyclohexyl isocyanide and isophorone diisocyanate. A particularly preferred blocked polyisocyanate is the methylethylketoxime blocked isocyanurate of hexamethylene diisocyanate. Also dimers or trimere of the diisocyanate are suitable. Also biurets of the isocyanates can be used. A preferred blocked polyfunctional isocyanide according to the invention is an adduct of 1,6-hexamethylene diisocyanate and 2-butanone oxime.

Component C is present in amounts of from 15 to 50% by weight preferably 20 to 45% by weight based on total amount of polymer composed of the component A, B and C.

Coloring agents (component D) such as inorganic or organic pigments and/or dyes can be used in the composition of the invention for coloring the sheet material of the invention. For generating a black color, carbon black paste is suitable as it is sold under the trade name Tack 1 (Degussa, Frankfurt, Germany). As a white colored pigment, titanium dioxide in silane modified form can be used (Kronos CL 310, Kronos Titan, Leverkusen, Germany). Also aluminum particles of 5 µm length in a solvent (STAPA-Off-Set 3000, Eckhart-Werke, Fürth, Germany) can be used. Other coloring pigments are C.I. pigment red 178/71155 (Paliogen rot L3910 HD, BASF, Ludwigshafen, Germany), C.I. pigment yellow 110 (Irgazin gelb 3RLT-N, Ciba-Geigy, Marienberg, Germany) as well as C.I. pigment blue 1511, Heliogen blau K6911D, BASF, Ludwigshafen, Germany).

The coloring agents (component D) are present in amounts of from 0.5 phr (parts per hundred resin) up to 100 phr based on total amount of the polymer composed of the components A, B and C.

Optionally, levelling agents (component E) may be added to the composition of the present invention. The levelling agents support the formation of a uniform and smooth surface without surface defects. Suitable levelling agents are generally organo silicones and fluorochemicals. For example, polyether modified methylpolysiloxane (commercially available under the tradename Bayslion OE17, Bayer Leverkusen) can be used as levelling agent. Particularly preferred is the commercially available product 3M Fluorad® FC 430. The levelling agent can be present in amounts of from 0.1 to 1.0 parts per hundred based on hundred parts polymer composition comprising A, B and C.

Optionally thickeners (component F) may also be added to the composition of the present invention. An example for suitable thickeners according to the invention is hydrophobic fumed silica such as Aerosile® R974 (Degussa, Frankfurt, Germany). The thickeners F can be present in amounts of from 1 to 10 phr based on hundred parts polymer composition comprising A, B and C.

As catalysts (component G) according to the invention there may be used those which in general promote urethane chemistry such as tin salts of organic acids. Preferred are dibutyltin dilaurate and tin octanoate. The tin catalysts may also be used with alkyl amines as cocatalysts. Useful cocatalysts include tetramethylbutanediamine (TMBDA) and 1,4-diaza[2.2.2]bicylooctane (DABCO) (Kunststoff Handbuch, Vol. 7, Polyurethane, Second Edition 1983, Karl Hanser Verlag (München, Wien)).

The skilled person understands that for adjusting characteristic properties of the halogen-free acrylic urethane sheet material of the invention and for economic reasons fillers may be added e.g. mica, calcium carbonate kaolin.

The halogen-free acrylic urethane sheet material of the invention can be prepared by the following process.

The acrylic polyol used in the present composition can be prepared by conventional free radical initiated polymerization processes in which monomers are blended with solvent, polymerization catalyst and, optionally, a chain transfer agent. The mixture is heated to 60° to 100° C. for 4 to 8 hours.

0.1 to 5 percent by weight based on the weight of monomers of a polymerization catalyst initiator is used to prepare the acrylic polyols. Suitable polymerization initiators include organic peroxides such as di-t-butyl peroxide and azo catalysts such as 2,2'-azobisisobutyronitrile.

Alternatively, the preparation of component A can also take place as an emulsion. The monomers, along with a suitable polymerization initiator, are dispersed in water using surfactants. The thermal polymerization is conducted by heating the emulsion until the polymerization is substantially complete. The resulting polymer A is then separated from the aqueous polymerization medium by precipitation or stripping techniques. The resulting polymer A can then be dissolved in organic solvent, producing a polymer solution similar in overall composition to that obtained in the organic solution polymerization described previously.

Component A is then mixed with component B as well as optional components such as coloring agents like pigments or dyes (component D), levelling agents (component E) and thickeners (component F). The cross-linking agent (component C) and optionally catalyst (component G) are preferably added to the mixture of A and B directly before the coating operations so that premature cross-linking reaction does not occur.

The sheet of the current invention is cast from organic solvent onto a removable support. The term removable support means an intermediate carrier. The removable support must have release properties and can be used also for surface modifying of the sheet which is cast onto the removable support. The releasing properties are essential for easy and complete removing of the sheets of the invention. The removable support should not be removed before the films arranged on the support are self-supporting during further processing. In order to impart a matt surface to the thin layer to be applied onto the removable support, a support with a rough surface is chosen, preferably Stripkote BOR Supermatte from S. D. Warren Company of Bornhem, Belgium.

Preferably the composition for manufacturing the sheets of the invention are arranged on the removable support by screen-printing or knife coating depending on the desired thickeners of the layer.

The sheet material of the invention is a sheet-shaped thin plastic film material and comprises the composition of the invention. The sheet material can be marked with conventional printing methods or radiation methods or combinations thereof. If radiation methods are used, a laser-marking method is preferred. A non-pigmented, clear monolayer sheet material can be prepared as described above by casting the composition of the invention onto the removable support for example with a knife-coater. This monolayer film is dried at elevated temperatures (80° to 100° C.) for several minutes and then at higher temperature, preferably 80° to 200° C. for some minutes in order to cure the mixture completely. This film is printable with conventional methods and also laser-markable. It is also possible to prepare a single pigmented layer which can be printed by conventional means and/or marked using a laser beam and the like.

If the halogen-free acrylic urethane sheet material of the invention is used as a laser-markable sheet material no primer or special treatment is necessary for the surface to be printed. However, if the label is intended for conventional printing methods, priming of the surface is preferred to promote adhesion of the inks to the upper surface to be printed. The priming may be performed by physical or chemical methods. As a physical method, corona discharge treatment is preferred. The chemical priming is a preferred method when the halogen-free acrylic urethane sheet material of the invention is provided with an adhesive on the side opposite to the one which will be marked. A chemical primer is preferably a diluted solution of an acrylate polymer or diluted adhesive.

DESCRIPTION AND DISCUSSION OF THE DRAWINGS

FIG. 4 shows another preferred embodiment of the sheet material of the invention as described in FIG. 1. On one side of layer 10 there is arranged a layer 40 of a pressure-sensitive adhesive or heat-activatable adhesive. Preferably a protective sheet 50 covers the surface of the adhesive layer 40 opposite to the surface which is bonded to layer 30.

FIG. 8 shows a cross-sectional view of the sheet material of FIG. 7 along the line I–I'. The first black layer is removed until the layer 20 (white) is reached or also some part of layer 20 might be removed, thus creating a readable character.

The letter "P" is created by partially removing black layer 10, thus letter "P" appears in white color. The numeral "1" is created by partially removing black layer 10 and white layer 20, thus the color of layer 30 appears in grey color and renders the respective character readable in a different contrast or color to the letter "P" being white in color.

FIG. 10 discloses the partially removed portion of layer 10 creating the letter "P" and the removing of layers 10 and 20 forming the numeral "1".

Figure 1:
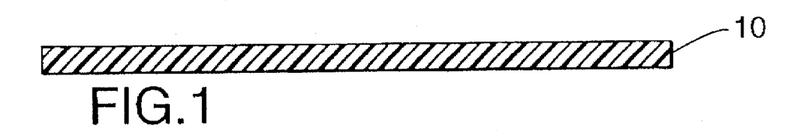
FIG. 1 shows schematically the halogen-free acrylic urethane sheet material of the invention as a single sheet 10 embodiment.

In a preferred embodiment of the invention the halogen-free acrylic urethane sheet consists of a single-layer sheet material 10 as shown in FIG. 1. The sheet material 10 can be marked by radiation methods or by conventional printing methods. The layer can be burned away partially by radiation methods in order to create an image. The image itself can be rendered more easily visible by printing ink on the surface of the halogen-free acrylic urethane sheet material 10. However, it is also possible that the sheet material 10 is printed with ink and afterwards the image is constructed by radiation methods removing the layer in specific areas and thus creating an image. Preferably the sheet material is 20 to 200 μm in thickness.

In a further preferred embodiment of the invention a multilayer sheet material can be used for radiation marking or printing (FIGS. 2 to 6).

The preferred method for forming the multilayer sheet is by casting of successive layers from organic solution. Each layer is partially dried before casting of the next layer to promote adhesion between the layers of the multilayer sheet material. Casting from organic solution can be performed in a variety of ways. The solution may be laid down by means of screen-printing, spraying or more traditional coating methods such as knife coating. Combination of coating methods for organic solution may be used as well to form the multilayer sheet material.

Multiple layers may also be coextruded. Combination of extrusion and lamination may also be used to produce a three-layer multilayer sheet, for example.

Figure 2:
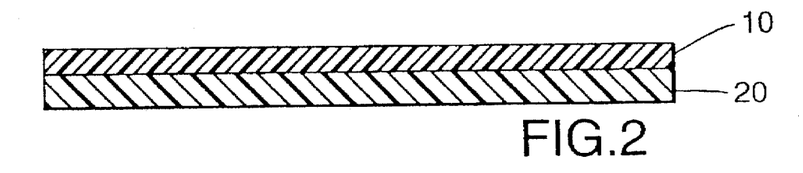
FIG. 2 shows a bilayer structure of the halogen-free acrylic urethane sheet material of the invention. The contrasting layers 10 and 20 are firmly bonded to each other.

In a preferred embodiment of the multilayer sheet material it comprises two layers (FIG. 2). The two layers 10, 20 comprise the same ingredients as the single layer as described above. Preferably the two layers 10, 20 differ in color. Preferably the contrast between the first layer 10 and second layer 20 of the bilayer sheet material is due to that the layers 10, 20 are different in color or opacity.

For producing such layers 10, 20 the appropriate coloring agents such as pigments, dyes, fillers or metal powders, graphite, polymer fibers, glass fibers, waxes, mineral fillers, organic or inorganic hollow particle fillers in different mixtures are previously admixed with the respective materials that are intended to form the layers 10, 20 of the multilayer sheet materials. A different coloration may be effected by adding organic and/or inorganic pigments as well as dyes. Thus, for example a black first layer 10 may be produced by adding carbon black to the polymer of the composition for manufacturing the layer. To provide a high contrast the second layer 20 may be dyed with a white pigment such as an inorganic pigment, for example titanium dioxide. When the black first layer is partially removed by the laser beam treatment, the white layer (second layer 20) is exposed so that an image appears.

It is preferred that the first layer 10 is white and is located on a colored second layer 20 or that the first layer 10 is colored and located on a black undersurface. Also preferred is a combination of a white thin first layer 10 and a second layer 20 dyed black. However, what is particularly preferred is a black thin first layer 10 on a white second layer 20 or silver metallic first thin layer 10 on a black second layer 20 or a black thin first layer 10 on a dyed second layer 20, for example red or yellow. The layer 10 is 2 to 25 µm, preferably 5 to 20 µm in thickness and the layer 20 is 30 to 100 µm, preferably 50 to 70 µm in thickness.

This bilayer sheet material as a representative example of the multilayer sheet material of the invention can also be marked by conventional printing methods as well as radiation methods or combinations thereof. It is advantageous to use such multilayer sheet materials as laser-markable labels because they have excellent mechanical properties, temperature resistance and weathering stability. Moreover, if these labels are marked with a laser beam no corrosive gases may come off the polymeric material because no halogen containing polymers are used.

Figure 3:
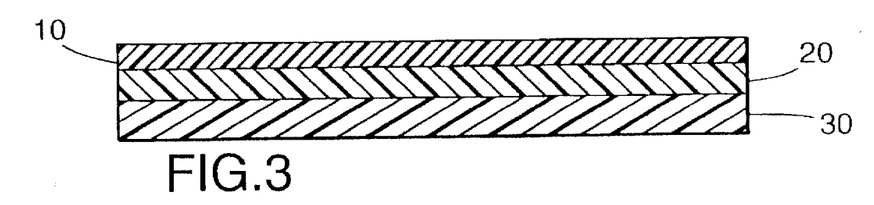
FIG. 3 shows schematically a three layer structure of the halogen-free acrylic urethane sheet material of the invention. The third layer 30 is preferably thicker than layers 10 and 20 which can be of the same or slightly different thickness. The layer 20 is firmly bonded to layers 10 and 30.

A further preferred embodiment of the present invention is a multilayer halogen-free acrylic urethane sheet material consisting of three layers (FIG. 3).

This sheet material of the invention consists preferably of two relatively thin layers 10, 20 on top of a thicker layer 30. This construction can be used for laser-marking application where it is desirable to have an image in two colors. The two-color image is created by a two-step laser-marking process.

The laser beam is first focused at a shallow depth relative to the upper surface of the film resulting in vaporization of the top layer 10. The image appears in the color of the second layer 20 and contrasts with the color of the top layer 10. The beam is then focused at a deeper point relative to the surface of the film resulting in vaporization of both the top layer 10 and the underlying layer 20. The image appears in the color of the bottom layer or base layer 30 which contrasts as well with the color of the top layer 10.

The three-layer film can be produced by the following method. A thin layer 10 of the coating composition of the present invention is coated onto a removable support. The layer is partially dried. A second thin layer 20 is then coated over the first thin layer 10 and partially dried as well. Then a third thicker layer 30 is coated over the second layer 20. The three layer composite is then dried and cured completely.

Preferably, the thickness of layer 10 is 2 to 25 µm, preferably 5 to 20 µm, layer 20 is 2 to 25 µm, preferably 5 to 20 µm and of layer 30 is 30 to 100 µm, preferably 50 to 70 µm.

For example, the manufacturing of a three-layer sheet material of the invention is carried out by screenprinting a first thin layer 10 followed by drying and partial curing and then screen-printing a second thin layer 20 followed again by drying and partial curing and finally casting a third thicker layer 30 with a knife-coater followed by drying and complete curing of the multilayer film. The curing is preferably effected for a period of 0.5 to 10 minutes and preferably of 2 minutes, at a temperature from 150° C. to 220° C. Drying and partial curing of the thin layer(s) is preferably carried out at a temperature of from 120° C. to 220° C. and particularly preferred of from 120° C. to 150° C. for a period from 1 to 5 minutes. The film, thus prepared, may be stripped from the removable support at this point.

The two layer halogen-free acrylic urethane sheet material of the invention is preferably prepared in a similar way as described above, however, by omitting the step regarding the layer 20.

For the layers of the sheet material of the invention, heating results in highly cross-linked layers which are solvent-resistant, heat-resistant, abrasion-resistant and non-weathering. The layers are intimately bonded to each other in the coating step before the curing reaction is completed.

Figure 4:
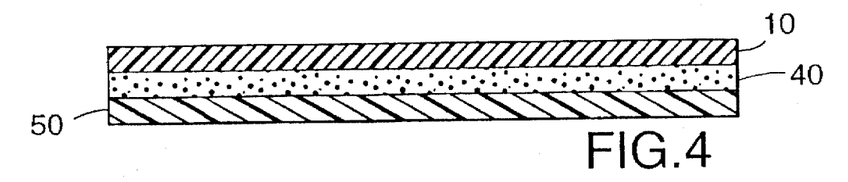
Figure 5:
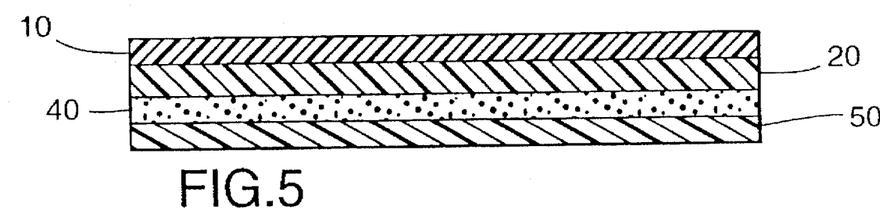
FIG. 5 shows schematically an arrangement of the adhesive layer 40 and the protective sheet 50 with the bilayer structure of FIG. 2.
Figure 6:
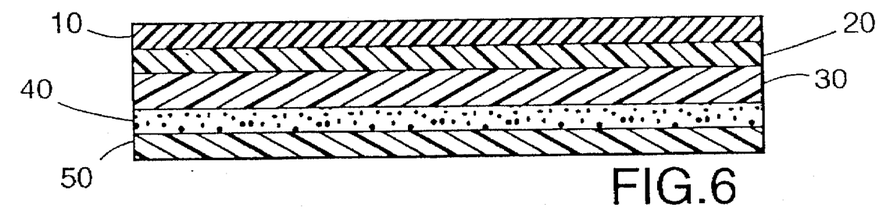
FIG. 6 shows schematically an arrangement of the adhesive layer 40 and the protective sheet 50 with the three layer structure of the sheet material of the invention as disclosed in FIG. 3.
Figure 7:
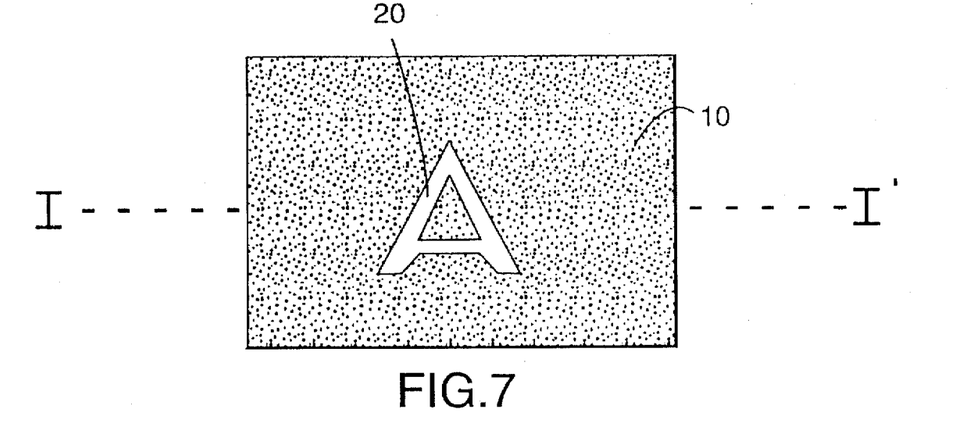
FIG. 7 shows an image which has been created by radiation marking of a bilayer sheet material as disclosed in FIG. 2. The layer 10 is black-colored and the layer 20 is of white color.
Figure 8:
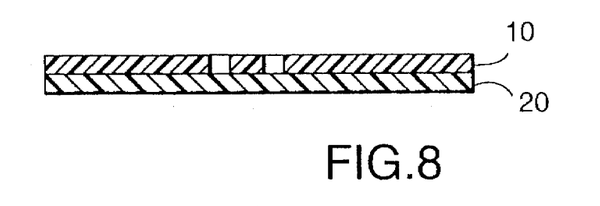
Figure 9:
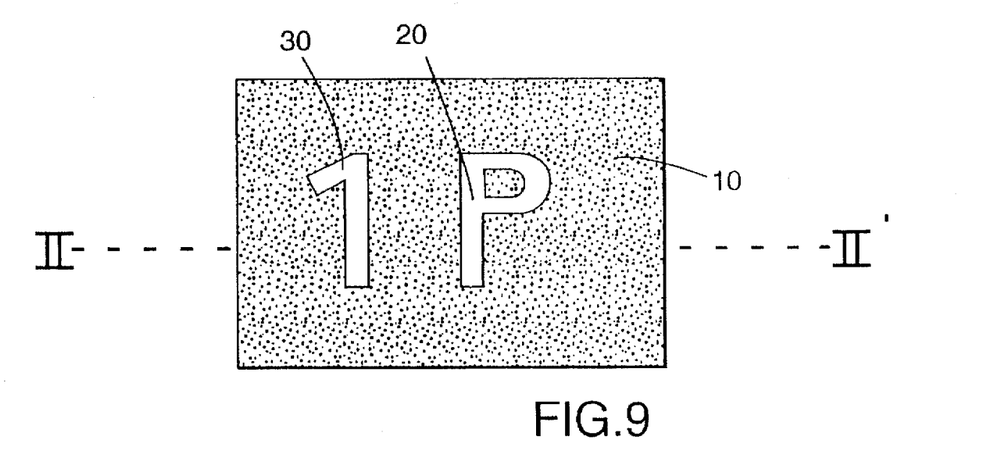
FIG. 9 shows a two-color image which has been created by radiation marking of a 3-layer sheet material as disclosed in FIG. 3. The layer 10 is of black color, layer 20 is of white color and layer 30 is of grey color.
Figure 10:
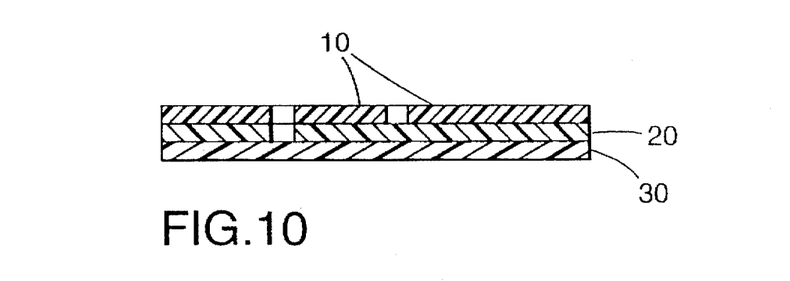
FIG. 10 shows schematically a cross-sectional view along the line II–II' of FIG. 9.

In a preferred embodiment of the invention the multilayer sheet material is provided with an adhesive layer 40 (FIGS. 4 to 6).

For making the adhesive layer 40, it is preferred to use pressure sensitive adhesives or heat-activatable adhesives. These may consist of polyacrylates, polyesters, polyolefins, polyamides, polyurethanes, silicone polymers, polybutadiene and copolymers, polyisoprenes and copolymers, natural and synthetic rubber as well as hydrogenated derivatives thereof with or without resins, fillers and cross-linking agents. Polyacrylates have also proven to be useful, particularly those which have been modified for use on a variety of surfaces having very different surface energies, such as steel/polyethylene.

Also for this kind of labels the pressure-sensitive adhesives which are particularly preferred are tackified isooctylacrylate and acrylic acid copolymers. The copolymers are preferably employed in amounts ranging from 50 to 70% and preferably in an amount of about 60% by weight. As the tackifying resin there is preferably used Foral 85 (company Hercules), a hydrogenated rosin or its glycerol or pentaerythritol esters in amounts of preferably 30 to 50% and particularly preferred of about 40% by weight. In the mixture of adhesive there are added usually antioxidants in amounts of about 1% and crosslinkers such as for example aziridine compounds.

Particularly preferred are acrylate based pressure-sensitive adhesive materials such as copolymers of isooctylacrylate and acrylic acid like those disclosed in U.S. Pat. No. 2,884,126 (U.S. Pat. No. Re: 24,906). The adhesive layer 40 has a thickness of 10 to 100 µm, preferably 20 to 60 µm.

The adhesive layer 40 can be protected by a protective sheet 50 (FIGS. 4 to 6).

The protective sheet 50 preferably is adhesive-repellant and more specifically consists of a paper or film which has been coated or modified with compounds of low surface energy relative to the above-identified adhesive. This purpose is served, preferably, by organo silicone compounds, fluoropolymers, polyurethanes and polyolefins. This protective sheet 50 consists of paper coated with adhesive repellant materials as mentioned above or a polymeric sheet produced from polyethylene, polypropylene, PVC, polyesters with or without the addition of adhesive-repellant compounds. Preferably, the protective sheet 50 has a thickness of 25 to 250 µm, preferably 80 to 120 µm.

In a preferred embodiment of the invention the sheet material has an adhesive layer 40 and optionally a protective sheet 50 forming a label stock. The label stock may be cut to form labels or may be left intact to be used as a larger self-adhesive decorative sheet.

The label stock of the present invention may also be formed by several methods. In multilayer sheet material intended for use as a laser-markable label stock, it is preferred that the upper layer 10 which is removed partially by the laser is thin to reduce the amount of material which must be burned away by the laser. This thin layer 10 must also be of relatively constant thickness so that the laser may be adjusted in its depth to burn through the layer consistently and completely and without excess expenditure of energy. The layers of the multilayer sheet material may be prepared individually by casting from organic solution or by extrusion techniques. The layers are then laminated together to form a multilayer sheet material.

However, the sheet material should be treated to promote adhesion between the sheet material and the pressure sensitive adhesive layer. This treatment can be by application of a chemical primer or more preferably by corona discharge treatment. One method of forming the label stock of the present invention consists of applying the pressure sensitive adhesive layer directly onto the treated sheet material. This may be by casting from organic solution or aqueous dispersion or by such techniques as hot melt coating. Optionally, a protective sheet may be added to cover the pressure sensitive adhesive layer until exposure of the adhesive is desired.

A second method of forming the label stock of the present invention consists of applying the pressure sensitive adhesive layer directly to the protective sheet. The adhesive layer with protective sheet combination is then laminated to the sheet material, thus forming the same construction as produced by the direct application of adhesive to the sheet material described previously.

The sheet material according to the invention, preferably, has an elongation at break of from 5 to 100% and, thus, is highly flexible and die-cuttable. Another advantage of the sheet material according to the invention consists in that it does not require any treatment by irradiation.

In an especially advantageous manner the sheet material according to the invention may be employed with a transporting device for laser-marking as proposed in the German patent application P 40 27 938 which is preferably used in a laser marking equipment. The sheet materials according to the invention, preferably the multilayer sheet materials may be used as laser-markable adhesive labels, especially for a product characterization by means of bar codes. They are also suitable for the production of informatory signs or sign boards of any type.

The advantages of the sheet material according to the invention result in that the plastic film sheet material can be produced by screen-printing procedures and thermally cured to produce smooth uniform sheets free of defects. The sheet material is markable with conventional printing methods, e.g. screen-, flexographic, off-set-printing or other ink-printing methods, toner-printing, xerographic-, laser-printing, thermotransfer as well as needle-printing. Multi-layer sheets are advantageous because the sheets comprise layers which are chemically bonded to each other. The individual layers are safely prevented from slipping relatively to each other and from separating. Furthermore, it is possible to provide a wide spectrum of color combinations. More particularly it is advantageous that the components of the plastics employed do not contain any toxic chemicals and upon marking with a laser beam preferably a Nd-YAG laser (1.064 nm) do not release any corrosive vapors the properties of the film can be determined within definite ranges especially with respect to the excellent heat-resistance, solvent-resistance and abrasion-resistance.

The invention is further illustrated by the following non-limiting example.

EXAMPLES A1–A4

Preparation of acrylate polyol (component A)

50 parts toluene and 50 parts butylacetate were charged to a reaction vessel equipped with a nitrogen purge, stirrer, thermometer and addition funnel. 2.5 parts di-t-butyl peroxide was added to the solvents at 60° C. 100 parts monomer mixture, of the composition described in table 1, was mixed with 2.5 parts azobisisobutyronitrile. The monomer mixture was added to the contents of the vessel with stirring in three equal portions: one portion initially, one portion after 1 hour and one portion after 2 hours. After the exotherm was complete, the reaction mixture was stirred at 60° C. for 8 hours. Final solids content was 49 to 51 weight-%.

TABLE 1

Component A Acrylate Polyol

| No. | sub-component (i) | | sub-component (ii) | | | | | Tg |
|---|---|---|---|---|---|---|---|---|
|  | 2-HEMA | HPMA | MMA | EMA | BA | IBMA | Styrene |  |
| A1 | 16 | — | 55.0 | 17 | — | 12 | — | 82 |
| A2 | 40 | — | 22.5 | — | — | — | 37.5 | 78 |
| A3 | 20 | — | 50.0 | — | 30 | — | — | 30 |
| A4 | — | 20 | 50.0 | — | — | — | 30.0 | 94 |

MMA=methyl methacrylate; EMA=ethyl methacrylate; BA=butyl acrylate; 2-HEMA=2-hydroxyethyl acrylate; HPMA=hydroxypropyl methacrylate; IBMA=isobutyl methacrylate; Tg=glass transition temperature.

Table 2A shows the weight-average molecular weight $M_w$, the number-molecular weight $M_n$ as well as the ratio $M_w/M_n$.

TABLE 2A

| No. | $M_w$ | $M_n$ | $M_w/M_n$ |
|---|---|---|---|
| A1 | 20.101 | 10.213 | 1.97 |
| A2 | 167.539 | 53.421 | 3.14 |
| A3 | 196.963 | 60.623 | 3.25 |

Molecular weight characterization of acrylic polyol component A and polyester diol component B has been by conventional gel permeation chromatography (GPC).

Instrumentation consisting of a series of Perkin Elmer components was used for all determinations. A model 400 pump was used in conjunction with an ISS 100 Automatic sampler and an LC 25 differential refractive index detector. Temperature control for the columns was provided by a Spark Holland HPLC column thermostat. Three PL gel mixed bed columns with a particle size of 10 μm and a length of 30 cm were held at 40° C. The solvent used to perform the measurement was stabilized tetrahydrofuran at a flow rate of 1 ml/min. The sample to be tested was injected as a 0.2% solution. All samples were treated with diazomethane prior to chromatography.

Data was collected using a PL Separation Sciences GPC Data Station. Calibration for molecular weight was performed using a series of ten narrow distribution polystyrene standards ranging in molecular weight from 1,200 to 2,950, 000. All molecular weights are polystyrene equivalent molecular weights.

The number-average molecular weight ($M_n$) and weight average molecular weight ($M_w$) are well known mathematical descriptions of the molecular weight of a polymer sample. The polydispereity, abbreviated "P", is a measure of the distribution of molecular weight and is defined as $M_w/M_n$. Each of the foregoing is a well known term used by the skilled person.

Preparation of coating mixtures

The solution of acrylate polyol (component A) are prepared above was mixed with a 50% by weight solution of aliphatic polyester diol (component B) in toluene. Optional components such as coloring agents (component D) and thickener (component F) were added, if present. The resulting mixture was rendered homogeneous by mixing on a ball mill for eight hours at room temperature.

Directly preceding the coating, blocked isocyanate (component C) was added as well as dibutyltindilaurate catalyst (component G) and the optional levelling agent (component E).

A list of the components B-E is given below.

Aliphatic polyesterdiol (component B)

B1: Epsilon-caprolactonediol, available under the tradename TONE™ 230 (Union Carbide, U.S.A.)

B2: Epsilon-caprolactonediol, available under the trade name TONE™ 260 (Union Carbide, U.S.A.)

Table 2B shows the weight-average molecular weight $M_w$, the number-average molecular weight $M_n$ as well as the ratio of $M_w/M_n$.

| No. | $M_w$ | $M_n$ | $M_w/M_n$ |
|---|---|---|---|
| B1 | 3.614 | 2.727 | 1.33 |
| B2 | 8.266 | 5.311 | 1.56 |

B3: slightly branched polyester polyol, available under the trade name Desmophen® 670 (Bayer Leverkusen, Germany)

B4: linear polyesterdiol, available under the trade name Oxyester Z 1326 (Hüls AG, Germany)

Blocked polyfunctional diisocyanate (component C)

C: adduct of 1,6-hexamethylene diisocyanate and 2-butanone oxime available under the trade name Desmodur BL 3175 (Bayer Leverkusen, Germany)

Coloring agents (component D)

D1: carbon black paste in soya alkyd resin available under the trade name Tack 1 (Degussa, Germany)

D2: titanium dioxide silane modified available under the trade name Kronos CL 310 (Kronos Titan, Germany)

D3: aluminum particles in solvent, 5 µm available under the trade name STAPA-Off-Set 3000 (Eckhart-Werke, Germany)

D4: C.I. Pigment red 178/71155 available under the trade name Paliogenrot L3910 HO (BASF, Germany)

D5: C.I. Pigment yellow 110 available under the tradename Irgazingelb 3RLT-N (Ciba-Geigy, Germany)

D6: C.I. Pigment blue 1511 available under the trade name Heliogen-Blau K6911D (BASF, Germany)

Other additives (component E)

E: polyether modified methylpolysiloxane (levelling agent) available under the trade name Baysilon OL17 (Bayer Leverkusen, Germany)

F: Hydrophobic fumed silica (thickener) available under the trade name Aerosil R 974 (Degussa, Germany)

G: dibutyltindilaurate (catalyst) (Aldrich)

Preparation of films

The films of the current invention were cast from organic solvent onto a removable support either by screen-printing or knife-coating, depending on the thickness and precision of the layer to be formed.

The removable support was a kraft paper coated with a synthetic acrylic resin. The support was obtained as Stripkote BOR, Supermatte from S. D. Warren Co. of Bornem, Belgium. Examples 1 to 14

Monolayer films

A coating mixture with the composition described in table 3 was coated onto the removable support with a knife-coater at a wet thickness of 100 µm. Levelling agent was added to each of the compositions used in a single-layer film. The coating was dried at 80° to 100° C. for two minutes and then at 195° C. for 2.5 minutes using a forced-air oven.

TABLE 3

| | Monolayer film | | | | | | | | |
|---|---|---|---|---|---|---|---|---|---|
| Ex. No. | A-Type | wt. % | B-Type | wt. % | C | wt. % | Comp. | D phr | color |
| 1 | A1 | 59 | B1 | 15 | C | 26 | D2 | 30.0 | white |
| 2 | A1 | 63 | B2 | 13 | C | 24 | D2 | 30.0 | white |
| 3 | A1 | 49 | B2 | 29 | C | 22 | D2 | 30.0 | white |
| 4 | A1 | 47 | B2 | 30 | C | 23 | D2 | 30.0 | white |
| 5 | A1 | 49 | B2 | 29 | C | 22 | — | — | transp. |
| 6 | A1 | 49 | B2 | 29 | C | 22 | D6 | 4.0 | blue |
| | | | | | | | D2 | 10.0 | white |
| 7 | A2 | 32 | B1 | 24 | C | 44 | D2 | 30.0 | white |
| 8 | A2 | 32 | B1 | 24 | C | 44 | — | — | transp. |
| 9 | A3 | 54 | B1 | 16 | C | 30 | D2 | 30.0 | white |
| 10 | A3 | 54 | B1 | 16 | C | 30 | D1 | 7.5 | black |
| 11 | A4 | 54 | B1 | 16 | C | 30 | D3 | 2.0 | silver |
| 12 | A4 | 54 | B1 | 16 | C | 30 | D6 | 4.0 | blue |
| | | | | | | | D2 | 10.0 | white |
| 13 | A1 | 31 | B3 | 34 | C | 35 | D2 | 30.0 | white |
| 14 | A1 | 30 | B4 | 37 | C | 33 | D2 | 30.0 | white |

The thickness of the Monolayer was 50 µm.

Amount of levelling agent was 0.08 phr.

Amount of catalyst dibutyltindilaurate was 0.2 phr.

This procedure is used to make a single layer of clear film to be used ultimately as a clear protective adhesive film which is printable by traditional means. It can also be used to prepare a single pigmented layer which is printable by conventional means.

Examples 15 to 25

Two layer sheet material

A coating mixture described under "first layer" in table 4 was coated onto the removable support using a flat bed screen printer with a 120 mesh screen to a wet thickness of 15 to 17 µm. The coating was dried at 80° to 100° C. for one minute and partially cured at 195° C. for about 90 seconds. The dry layer is about 10 µm in thickness.

A second thicker layer corresponding to the composition under "second layer" in table 4 was coated on top of the thin partially cured layer with a knife-coater in a wet thickness of 120 µm and then dried and cured under the conditions given above for monolayer film having a thickness of about 60 µm.

The two layers having a total thickness of about 70 µm are rendered recognizably different from each other by the presence or absence of pigments. The two layer sheets described are useful for laser-marking.

TABLE 4

Two layer film

| Ex. No. | Layer | Thickness | A-Type | wt. % | B-Type | wt. % | C | wt. % | D-Type | phr | color |
|---|---|---|---|---|---|---|---|---|---|---|---|
| 15 | first | 11 | A2 | 37.0 | B2 | 22.0 | C | 41.0 | D1 | 17.0 | black |
|  | second | 60 | A2 | 37.0 | B2 | 22.0 | C | 41.0 | D2 | 30.0 | white |
| 16 | first | 12 | A1 | 54.0 | B2 | 23.5 | C | 22.5 | D1 | 17.0 | black |
|  | second | 40 | A1 | 54.0 | B2 | 23.5 | C | 22.5 | D2 | 30.0 | white |
| 17 | first | 13 | A2 | 29.5 | B1 | 28.0 | C | 42.5 | D1 | 17.0 | black |
|  | second | 50 | A2 | 29.5 | B1 | 28.0 | C | 42.5 | D2 | 30.0 | white |
| 18 | first | 12 | A1 | 54.0 | B2 | 23.5 | C | 22.5 | D3 | 8.0 | silver |
|  | second | 48 | A1 | 54.0 | B2 | 23.5 | C | 22.5 | D1 | 7.5 | black |
| 19 | first | 12 | A1 | 56.0 | B1 | 17.0 | C | 27.0 | D3 | 8.0 | silver |
|  | second | 48 | A1 | 56.0 | B1 | 17.0 | C | 27.0 | D1 | 7.5 | black |
| 20 | first | 10 | A1 | 58.7 | B2 | 18.3 | C | 23.0 | D2 | 80.0 | white |
|  | second | 50 | A1 | 58.7 | B2 | 18.3 | C | 23.0 | D1 | 7.5 | black |
| 21 | first | 11 | A1 | 58.7 | B2 | 18.3 | C | 23.0 | D1 | 17.0 | black |
|  | second | 51 | A1 | 58.7 | B2 | 18.3 | C | 23.0 | D4 | 6.0 | red |
|  |  |  |  |  |  |  |  |  | D2 | 7.5 | white |
| 22 | first | 13 | A1 | 58.7 | B2 | 18.3 | C | 23.0 | D5 | 6.0 | yellow |
|  |  |  |  |  |  |  |  |  | D2 | 7.5 | white |
|  | second | 49 | A1 | 58.7 | B2 | 18.3 | C | 23.0 | D1 | 7.5 | black |
| 23 | first | 12 | A1 | 58.7 | B2 | 18.3 | C | 23.0 | D6 | 4.0 | blue |
|  | second | 48 | A1 | 58.7 | B2 | 18.3 | C | 23.0 | D2 | 30.0 | white |
| 24 | first | 12 | A1 | 58.7 | B2 | 18.3 | C | 23.0 | D2 | 80.0 | white |
|  | second | 50 | A1 | 58.7 | B2 | 18.3 | C | 23.0 | D6 | 2.0 | blue |
| 25 | first | 12 | A1 | 31.0 | B3 | 34.0 | C | 35.0 | D1 | 17.0 | black |
|  | second | 60 | A1 | 31.0 | B3 | 34.0 | C | 35.0 | D2 | 30.0 | white |

Examples 26 and 27

Multilayer sheet material

Multilayer films were prepared by screen-printing a first thin layer, followed by drying and partial curing, and then screen-printing a second thin layer, followed again by drying and partial curing, and finally casting a third thicker layer with a knife-coater, followed by drying and complete curing of the multilayer film. Compositions of the multilayer films are shown in table 5. Each layer was rendered recognizably different from other layers by the presence or absence of various coloring pigments.

TABLE 5

| Ex. No. | Layer | Thickness | A-Type | wt. % | B-Type | wt. % | C | wt. % | D-Type | wt. % | color |
|---|---|---|---|---|---|---|---|---|---|---|---|
| 26 | first | 12 | A1 | 58.7 | B2 | 18.3 | C | 2.3 | D2 | 80.0 | white |
|  | second | 10 | A1 | 58.7 | B2 | 18.3 | C | 2.3 | D1 | 17.0 | black |
|  | third | 50 | A1 | 58.7 | B2 | 18.3 | C | 2.3 | D4 | 5.0 | red |
|  |  |  |  |  |  |  |  |  | D2 | 7.5 | white |
| 27 | first | 10 | A1 | 58.7 | B2 | 18.3 | C | 23.0 | D4 | 7.5 | red |
|  |  |  |  |  |  |  |  |  | D2 | 7.5 | white |
|  | second | 10 | A1 | 58.7 | B2 | 18.3 | C | 23.0 | D6 | 3.0 | blue |
|  | third | 49 | A1 | 58.7 | B2 | 18.3 | C | 23.0 | D2 | 7.5 | white |

The levelling agent (component E) was present only in the third layer in an amount of 0.08 phr.

The thickener (component F) was present in first and second layer in an amount of 1.5 phr.

The catalyst (component G) was present in each layer in an amount of 0.2 phr.

Preparation of the label stock

The single-layer or multilayer polyurethane films prepared above were corona treated to improve anchorage of the pressure-sensitive adhesive to the film.

An organic solution of an acrylate pressure-sensitive adhesive was prepared by polymerizing a mixture of isooctyl acrylate and acrylic acid in a ratio of 94 to 6 by weight in organic solvent using azoblsisobutyronitrile thermal initiator. The resulting adhesive was coated onto a siliconized paper and dried to a final thickness of 25 μm, thus forming a transferable adhesive layer.

The transferable adhesive layer was laminated to one side of the single layer film or to the thicker second layer of the bi-layer film, or to the third thicker layer of the multilayer film, thus forming a label stock.

Mechanical properties and durability of the sheet materials and multilayer sheet materials The mechanical properties, tensile strength at break, elongation at break and secant modulus were determined in accordance with (the German standard of), DIN 53455.

Preparation of test samples for Heat Resistance, Chemical Resistance and Weathering Resistance Tests:

100 mm×25 mm samples of label stock were adhered to aluminum panels by rolling over the label twice with a 2 kg rubber-coated roller. The samples were aged 24 hours at room temperature before testing.

The chemical resistance, abrasion resistance, weathering resistance and heat-resistance of the test samples were determined as follows:

Heat resistance

The samples of 100 mm×25 mm in size in the adhered conditions were exposed to heat at a temperature of 200° C. for a period of one hour in a forced-air oven. Each sample was evaluated with respect to shrinkage, adhesion and color changes. The evaluation symbols given in Table 6 have the following meanings:

o=acceptable;
+=good;
++=very good.

chemical resistance

The resistance to chemicals was tested by immersing the samples into the respective test liquids for a period of 10 seconds, followed by drying for 20 seconds; this procedure was repeated five times.

Tested was the resistance of the recording material to toluene, gasoline, ethanol, trichloroethane and methyl ethyl ketone. Furthermore, the behavior of the material in dilute alkali and dilute acid solutions was examined. The evaluation symbols have the following meanings:

o=acceptable;
+=good;
++=very good.

The heat resistance and solvent resistance of the recording material may be improved by the addition of inorganic fillers, which, however, is at the expense of the resilience property.

Weathering resistance

The weathering property was tested by means of quick-weathering apparatus QUV of the Company Q-Panel (Cleveland, Ohio, U.S.A.). The daily cycle included 15 hours of UV irradiation and 9 hours of moist condensation at 40° C. The evaluation after a total of 1,500 hours of testing (altogether) was based on the following standard:

o=acceptable (slight yellowish discoloration);
+=good (for example, a matt surface);
++=very good (no change).

Abrasion resistance

The abrasion was tested by a method similar to that of DIN 53754. In DIN 53754 the samples are evaluated by weighing to determine the amount of material lost by abrasion. Test results provided below were determined by visual inspection of the abraded surface. The abrasion from the first layer was visually evaluated by the following standard:

+=good (distinctly visible tracks on the surface);
++=very good (some matt tracks on the surface).

Heat shrinkage

A sample of 5×10 cm was applied on aluminum panel using a 2 kg rubber-coated roller as described above and cut with a razor blade, two lines in a distance of 5 cm cross direction and 3 cm between the cross lines in length direction. The sample was heat stressed at 130° C. for 15 minutes. The shrinkage was measured by microscope and crackforming was determined visually.

o=slight cracks, shrinkage$\leq 1,0\%$
+=no cracks, shrinkage$\leq 0,5\%$
++=no cracks, shrinkage$\leq 0,1\%$

TABLE 6

Mechanical Properties and durability of the sheet material

| Ex. No. | Tensile strength N/mm$^2$ | Elongation at break % | Secant modulus N/mm$^2$ | Rating Resistance Chem. | Abrasion | Weather | Heat | Heat shrinkage |
|---|---|---|---|---|---|---|---|---|
| 1 | 47.6 | 3.9 | 1400 | ++ | + | ++ | ++ | ++ |
| 2 | 45.0 | 3.0 | 2000 | ++ | + | ++ | ++ | ++ |
| 3 | 18.7 | 51.0 | 250 | o | ++ | ++ | + | ++ |
| 4 | 18.0 | 110.0 | 200 | o | ++ | ++ | + | ++ |
| 5 | 18.4 | 69.3 | 328 | o | ++ | ++ | + | ++ |
| 6 | 14.1 | 65.5 | 160 | o | ++ | ++ | + | ++ |
| 7 | 34.95 | 6.8 | 850 | + | ++ | + | + | o |
| 8 | 28.3 | 5.0 | 680 | + | ++ | o | + | o |
| 9 | 21.0 | 8.6 | 400 | o | ++ | + | ++ | o |
| 10 | 23.0 | 9.0 | 420 | o | ++ | ++ | ++ | o |
| 11 | 41.0 | 4.4 | 980 | ++ | + | + | ++ | + |
| 12 | 40.0 | 5.0 | 950 | ++ | + | + | ++ | + |
| 13 | 39.0 | 11.2 | 840 | + | + | + | + | o |
| 14 | 12.0 | 76.0 | 40 | o | ++ | o | o | + |
| 15 | 18.0 | 17.0 | 1800 | + | + | + | + | o |
| 16 | 34.0 | 35.0 | 3100 | ++ | ++ | ++ | ++ | ++ |
| 17 | 29.0 | 5.5 | 700 | + | ++ | + | + | o |
| 18 | 22.0 | 42.0 | 1800 | + | ++ | ++ | + | ++ |
| 19 | 38.0 | 5.5 | 3300 | ++ | ++ | ++ | ++ | ++ |
| 20 | 26.0 | 23.0 | 2300 | + | + | ++ | ++ | ++ |
| 21 | 28.0 | 25.0 | 2500 | ++ | ++ | ++ | ++ | ++ |
| 22 | 27.0 | 24.0 | 2300 | ++ | ++ | + | + | ++ |
| 23 | 30.0 | 18.0 | 3000 | ++ | ++ | ++ | ++ | ++ |
| 24 | 27.5 | 20.0 | 2200 | ++ | ++ | ++ | ++ | ++ |
| 25 | 40.0 | 10.0 | 400 | + | + | ++ | ++ | + |
| 26 | 31.0 | 17.0 | 2800 | ++ | ++ | ++ | ++ | ++ |
| 27 | 30.0 | 19.0 | 2500 | ++ | ++ | ++ | ++ | ++ |

We claim:

1. A halogen-free acrylic urethane sheet material comprising a self-supporting film of a polymer comprising the reaction product of components A, B, and C wherein component A comprises a copolymer of
(i) a monoester of acrylic or methacrylic acid and an aliphatic diol having 2 to 8 carbon atoms and (ii) an ester of acrylic or methacrylic acid and an aliphatic alcohol having 1 to 8 carbon atoms, and (iii) optionally a vinyl group containing material selected from the groups consisting of a vinyl aromatic monomer of N-vinylpyrrolidone and N-vinylcaprolactame, said component A having a Tg of 30° C. to 100° C.;

component B comprises an aliphatic polyester diol with a weight-average molecular weight less than 20,000; and a component C consisting essentially of a polyfunctional isocyanate or blocked polyfunctional isocyanate.

2. The halogen-free acrylic urethane sheet material of claim 1 wherein the aliphatic diol of subcomponent (i)has 2 to 4 carbon atoms and the aliphatic alcohol of subcomponent (ii) has 1 to 4 carbon atoms.

3. The halogen-free acrylic urethane sheet material of claim 1 wherein subcomponent (i) comprises from 5 to 50% by weight of component A, and subcomponent (ii) correspondingly comprises from 50 to 5% by weight of component A, and wherein up to 70% by weight of subcomponent (ii) can be replaced by subcomponent (iii).

4. The halogen-free acrylic urethane sheet material of claim 1 wherein additionally are present coloring agents, thickeners or leveling agents.

5. The halogen-free acrylic urethane sheet material of claim 1 wherein component A is present in amounts of from 15 to 80 percent by weight based on total mount of components A, B and C, component B is present in amounts of from 5 to 50% by weight based on total amount of components A, B and C, component C is present in mounts of from 15 to 50% by weight based on total amount of components A, B and C.

6. The halogen-free acrylic urethane sheet material of claim 5 wherein component A is present in amounts of from 30 to 60% by weight based on total amount of components A, B and C, component B is present in amounts of from 15 to 30% by weight based on total amount of components A, B and C, and component C is present in amounts of from 20 to 45% by weight based on total amount of components A, B and C.

7. The halogen-free acrylic urethane sheet material of claim 1 wherein component B is a poly-epsilon-caprolactone-diol with a weight-average molecular weight of 500 to 10,000.

8. The halogen-free acrylic urethane sheet material of claim 7 wherein component C is an adduct of 1,6-hexamethylene diisocyanate and 2-butanone oxime or a dimer of the polyfunctional isocyanate.

9. The halogen-free acrylic urethane sheet material of claim 1 further comprising a mark made by at least one of conventional printing methods and radiation methods.

10. The halogen-free acrylic urethane sheet material of claim 9 wherein the sheet material is laser-marked.

11. Process for preparing a sheet material according to claim 1 comprising the steps of copolymerizing the subcomponents (i), (ii) and (iii) of component A in solution to form a copolymer;

mixing the copolymer in solution with components B and C, and in any order to form a mixture, providing a film of the mixture and curing the mixture to form a first layer;

providing a second layer and joining the first and second layers together.

12. A process according to claim 11 wherein the first layer is applied to a removable surface and partially dried after which the second layer is applied to the first layer and at least partially dried.

13. A process according to claim 11 followed by applying a layer of a pressure sensitive adhesive or heat-activatable adhesive on one side of the sheet material.

14. A process according to claim 13 wherein the side on which the pressure-sensitive or heat activatable adhesive is applied has been primed by chemical or physical methods.

15. A process for producing the sheet material of claim 1 by spray-coating or screen-print coating a removable support with a reactive layer of the composition comprising the components A, B and C followed by drying for a time to partially cure the first layer (1) of the composition;

coating onto the resultant first layer a second layer of the composition;

optionally repeating the previous step for producing a third layer; and curing the layers.

16. A process according to claim 15 wherein the removable support has a rough surface structure for providing a matte surface structure of the first layer.

17. A multilayer markable, halogen-free acrylic urethane sheet material comprising a first layer of the self supporting film of claim 1 firmly bonded to a second layer comprising an adhesive material.

18. A multilayer sheet material according to claim 17 wherein the adhesive material is selected from the group consisting of heat activatable adhesives and pressure sensitive adhesives.

19. A multilayer sheet material comprising first and second layers wherein both the first and second layers each comprise a halogen-free acrylic urethane sheet material according to claim 1.

20. A multilayer sheet material according to claim 19 wherein said first and second layers have a contrast in color.

21. A multilayer sheet material according to claim 19 further comprising an adhesive layer.

22. A radiation marked multilayer sheet material according to claim 19.

23. A radiation marked multilayer sheet material according to claim 22 wherein the radiation employed was laser energy.

24. A radiation marked multilayer sheet material according to claim 22 wherein the first layer has areas removed therefrom in an image-wise manner.

25. A method of marking the sheet according to claim 1 comprising exposing the first layer to radiation to form an image therein.

26. A sheet material according to claim 1 having a printed image thereon.

* * * * *

UNITED STATES PATENT AND TRADEMARK OFFICE
CERTIFICATE OF CORRECTION

PATENT NO. : 5,688,573
DATED : November 18, 1997
INVENTOR(S) : Siegfried Goeb and Iris Maassen It is certified that error appears in the above-identified patent and that said Letters Patent is hereby corrected as shown below:

Column 19, line 5, "monomer of" should read --monomer,--;

Column 19, line 10, "a component" should read --component--;

Column 19, line 29, "mount" should read --amount--;

Column 19, line 34, "mount" should read --amount--;

Column 20, line 4, "mixture," should read --mixture;--; and

Column 20, line 14, "heat-activatable" should read --heat-activated--.

Signed and Sealed this

Seventeenth Day of April, 2001

Attest:

NICHOLAS P. GODICI

Attesting Officer

Acting Director of the United States Patent and Trademark Office